United States Patent [19]

Lee

[11] Patent Number: 5,385,780

[45] Date of Patent: Jan. 31, 1995

[54] SINTERABLE MASS OF POLYMER POWDER HAVING RESISTANCE TO CAKING AND METHOD OF PREPARING THE MASS

[75] Inventor: Biing-Lin Lee, Broadview Heights, Ohio

[73] Assignee: The B. F. Goodrich Company, Akron, Ohio

[21] Appl. No.: 91,631

[22] Filed: Jul. 14, 1993

Related U.S. Application Data

[63] Continuation-in-part of Ser. No. 623,323, Dec. 5, 1990, abandoned.

[51] Int. Cl.⁶ .................... B28B 11/06; B29C 59/00; B32B 5/16
[52] U.S. Cl. .................................. 428/325; 264/122; 264/126; 264/127; 264/131; 427/212; 428/144; 428/308.4; 428/317.9; 428/327; 428/328; 428/329; 428/330; 428/331; 428/403; 428/404; 428/406; 428/407; 521/145; 521/919; 523/201; 523/205; 523/206; 525/902
[58] Field of Search .............. 264/122, 131, 126, 127; 427/212, 144; 428/325, 327, 328, 329, 330, 331, 403, 404, 406, 407, 308.4, 317.9; 523/201, 205, 206; 525/902; 521/145, 919

[56] References Cited

U.S. PATENT DOCUMENTS 5,034,432 7/1991 Ueno et al. .................... 523/221

*Primary Examiner*—D. S. Nakarani
*Attorney, Agent, or Firm*—Alfred D. Lobo; Nestor W. Shust

[57] ABSTRACT

Particles of a fine powder of a thermoplastic synthetic resin (host powder) having a suitable broad range between its initial glass transition temperature (initial $T_g$) and its final $T_g$, are partially coated with an anti-caking coating powder (coating powder) by blending at an elevated temperature to form "mottled" particles. The elevated temperature is defined in relation to the initial and final $T_g$s as: (initial $T_g - 20$)° C. but below the final $T_g$. Mottled particles, without being encapsulated, have the unique ability to maintain their individual particulate characteristics at a temperature at least 10° C. above the initial $T_g$ of the uncoated host powder, and flow freely under applied pressure. Such pressure is applied by a rolling drum which spreads the mottled particles onto a target bed where they are selectively sintered with a controlled high energy beam, usually a laser beam. Sequentially sintering contiguous layers of the mottled particles results in a porous sintered body. Such a body may be used to make a prototype of an article, which may be difficult or too expensive to machine, then to form a shell mold for use in investment casting. Mottled particles, when stored above their initial $T_g$, form a bed from 10% to 65% more dense than a bed of uncoated host particles, even when the coating powder coats less than 50% of the area of the particles of host powder.

38 Claims, 5 Drawing Sheets

SINTERABLE MASS OF POLYMER POWDER HAVING RESISTANCE TO CAKING AND METHOD OF PREPARING THE MASS

This application is a continuation-in-part application of Ser. No. 07/623,323 filed Dec. 5, 1990 now abandoned.

BACKGROUND OF THE INVENTION

A method for producing a shaped article by a selective laser sintering (SLS) process is disclosed in U.S. Pat. Nos. 4,863,538 to Deckard; 4,938,816 to Beaman et al; and, 4,944,817 to Bourell et al, the disclosure of each of which nis incorporated by reference thereto as if fully set forth herein. The shaped article is formed by sintering a powder of one or more materials. "Sintering" is defined by the heating of the powder to a temperature which causes viscous flow only at contiguous boundaries of its particles, with at least some portion of substantially all particles remaining solid. Such sintering causes coalescence of particles into a sintered solid mass the density of which is increased compared to the bulk density of the powder particles before they were sintered; and, a part formed by layer-wise joining of plural vertically contiguous layers is therefore said to be autogenously densified.

The goal of the invention is to produce a powder of partially coated particles no greater than 177 $\mu$ (microns, about 80 mesh U.S. Standard sieve series), which coated powder has a higher bulk density ("densified") than in the uncoated state, is surprisingly free from static electric charge, and is flowable at a temperature above its initial transition temperature at which it becomes. sticky, and would not be flowable without being coated. By "flowable" is meant that the partially coated powder can be transferred by spreading it, with essentially all particles of the powder being separate one from the other, in a free-flowing layer of uniform thickness, no more than about 250 $\mu$ (10 mils) thick, with the application of minimal force, less than 500 g-force, and without the partially coated powder (hereafter also referred to as "coated powder" for brevity) changing its particulate characteristics.

The uncoated "virgin" powder, referred to as the "host" or "first" powder, is coated with a coating which itself is also a powder and is referred to as the "coating powder" or "anti-caking" or "second" powder. The coating powder is made up of particles <44 $\mu$ in average diameter, and smaller than those of the host powder. The size of both, the host particles and the coating particles is critical because when the host particles are >177 $\mu$, most materials likely to be used in the process of this invention do not sinter at a high enough rate to form a sufficiently dense sintered body for the purpose at hand; and, coating particles 20 $\mu$ in average diameter, or larger, are reluctant to adhere to host particles of usable size. This is particularly true for a host powder of polycarbonate ("PC"), acrylonitrile-butadiene-styrene ("ABS"), or, poly(vinyl chloride) ("PVC") powder coated with an inorganic powder.

The coated powder is said to be flowable because individual particles do not coalesce (stick together). Contiguous particles coalesce when they reach a temperature at which each becomes soft enough to cause fusion. The property of non-coalescence of the novel powder is noteworthy because the property persists under temperature conditions at which one, knowing the uncoated host powder would coalesce, is surprised to find that the partially coated powder does not. The individual particles of coated powder are referred to as being "mottled" because the surface of each host particle is only partially coated with particles of coating powder, and not encapsulated.

Spreading of the coated powder is accomplished by exertion of only as little as 5 g-force, and no more than 500 g-force. The force is measured by a "Draw-Plate" technique described in greater detail in Polymer Engineering and Science, Vol. 28, 249 (1988).

The invention is also directed to a method of producing a solid porous article from the coated powder. This article not only has the precise dimensions of the shape desired, but is dense enough to provide a prototype having nearly all but those properties attributable to the fully dense (so termed if it has essentially no measurable porosity) article eventually to be manufactured.

The above method is carried out in an apparatus which includes a laser or other directed energy source which is selectable for emitting a beam in a target area where the part is produced. A powder dispenser system deposits powder into the target area. A laser control mechanism operates to move the aim of the laser beam and modulates the laser to selectively sinter only the powder disposed within defined boundaries to produce the desired layer of the part. The control mechanism operates selectively to sinter sequential layers of powder, producing a completed part comprising a plurality of layers sintered together. The defined boundaries of each layer correspond to respective cross-sectional regions of the part. Preferably, the control mechanism includes a computer—e.g. a CAD/CAM system to determine the defined boundaries for each layer. That is, given the overall dimensions and configuration of the part, the computer determines the defined boundaries for each layer and operates the laser control mechanism in accordance with the defined boundaries for each layer. Alternatively, the computer can be initially programmed with the defined boundaries for each layer.

A part is produced by depositing a first portion of powder onto a target surface, scanning the aim of a directed energy beam (preferably a laser) over the target surface, and sintering a first layer of the first powder portion on the target surface. The first layer corresponds to a first cross-sectional region of the part. The powder is laser-sintered by operating the laser beam when the aim of the beam is within the boundaries defining the first layers. A second portion of powder is deposited onto the first laser-sintered layer and the aim of the laser beam scanned over the first laser-sintered layer. A third layer of the powder is laser-sintered by operating the laser beam when the aim of the beam is within the boundaries defining the second layer. Sintering of the third layer also joins the first and second layers into a cohesive mass. Successive portions of powder are deposited onto the previously sintered layers, each layer being laser-sintered in turn.

Repetition of the foregoing steps results in the formation of a bed of powder, the surface of which continually presents the target surface, and if the particles of powder are overheated by the beam at the boundaries of the article, the sharp definition of the boundaries is lost. It is therefore essential that the particles of powder outside the defined boundaries of the article to be formed, to avoid being sintered and retain their individual particulate identities.

In the '817 patent, it is taught that a powder may be formed by blending plural materials having more than one bonding temperature, or, more than one dissociation temperature (col 4, lines 3–9). By "bonding temperature" is meant melting temperature or softening temperature. "Dissociation temperature" refers to the temperature at which a molecule breaks up into simpler portions.

Blending is illustrated by a blend of particles of first and second materials (see '817, FIG. 9) which blend is then heated in a portion of the sintering cycle (see col 6, lines 30–33) so that the second material (coating material) encapsulates the first material. The encapsulating material has a lower bonding or dissociation temperature than the first, so that, upon being further subjected to laser energy sufficient to produce sintering, the second material melts and infiltrates the powder mass in the area surrounding each particle of first material (see col 6, lines 39–42). In so doing, because the first material (before it is encapsulated) has a bonding temperature higher than that obtained with the laser during the sintering process, the second material (the coating material) melts but the first material is not sintered. It (first material) is held within in the heated mass by the infiltration of the coating (second material). In the final stages of sintering, the coating is dissociated and the virgin first material is sintered.

But the material with the higher bonding or dissociation temperature need not be sintered; it may retain its original structure (see '817, col 6, lines 53–57).

For example, a conducting material is coated with an insulating polymer material and sintered. The insulator is later removed, resulting in a conductive, sintered product. In another example, tungsten carbide particles may be coated with cobalt to produce a powder which when sintered, results in melting of the cobalt and infiltration of the tungsten carbide (see '817, top of col 7).

My invention requires that I use a sinterable host powder, and, that it be partially coated with a coating powder which preferably, is not sinterable at a temperature at which the sinterable powder is sintered. Further, the partially coated host powder cannot have a narrow range over which transition from one state to another occurs, but one which ranges over more than at least 3° C. (referred to as a "broad range of transition"); and the coating powder cannot be dissociated. In my sintered article, interparticle chain diffusion occurs when partially coated, or mottled host particles are those of a synthetic resinous material (polymer); and, intermolecular diffusion occurs when the mottled host particles are not of an organic polymer.

Since I require either interparticle chain diffusion or intermolecular diffusion for sintering a host powder, it seemed that encapsulating a sinterable host material with a coating powder having a higher temperature than the host, was simply the wrong thing to do. Further, it seemed likely that, as long as some portion of the host powder material was uncoated, it would be unavoidably sintered at a temperature which was only slightly above (a) its glass transition temperature $T_g$ (if the host powder is amorphous), or, (b) its m pt (if the host powder is crystalline), or, (c) above its heat distortion temperature (HDT) if the host powder is a thermosetting resin ("TSR").

A crystalline host powder is an inapt choice for a solution to the problems to be solved in this invention, because a crystalline powder generally has a relatively sharp m p, and therefor does not offer an adequate "temperature window of sinterability" ("WOS" for brevity). A typical melting point extends over a range of less than about 3° C., unless the powder has a high molecular weight, or contains impurities; or the powder, though pure, contains infinitesimal portions on a submicroscopic or molecular scale which have widely varying molecular weights, such as are found in many waxes. By a WOS (temperature window of sinterability) I refer to a range of temperature, from that at which laser-sintering commences at the initial $T_g$ of the coated powder, up to its final $T_g$, at which sintering ceases. A temperature high enough that sintering ceases is evidenced by the coated powder becoming a semi-solid or liquid having essentially no porosity.

A powder of a TSR is also an ill-suited choice for the purpose at hand because the surfaces of individual TSR particles do not have acceptable fusion characteristics when heated by a laser beam. Therefore the desirable host powder of this invention is of a thermoplastic material. No further consideration will be accorded either crystalline host powders or powders of a TSR in this specification.

It should be recognized that, though all thermoplastic synthetic resinous powders can be sintered, the problem is to produce a sintered part of adequate strength for the purpose at hand. It is known that the higher the bulk density of the powder used, the higher is the density of the layers of the powder which are to be sintered, and the greater is the strength of the article formed. In this context, it was decided to choose a host powder known to be sinterable, and one which could be coated with a coating powder in a dry-blending process.

In the prior art, since the powder to be sintered was either not coated, or coated to lower its sintering temperature, it was not possible to maintain a target bed of powder above the initial $T_g$ of the powder without having the bed cake up.

The function of the coating powder was (a) to raise the storage temperature at which the host powder could be stored as much as possible without allowing the powder to cake, (b) to negate the expected static electrical charge due to mechanically dry-blending, and (c) to densify the coated powder, while the coating powder was to undergo no change in physical state. This function of the coating powder is the same whether it is crystalline such as in magnesium orthosilicate having a sharp melting point, or as in poly(butyleneterephthalate) (PBT), nylon 11, poly(phenylene sulfide) (PPS), or poly(ethyleneterephthalate) (PET); or, amorphous with a high $T_g$ such as a polyarylene polyether; or, amorphous in one temperature range and crystalline in another, as in a thermoplastic elastomer having a high m pt. In other words, other than its finely divided powdery state, which allows the coating powder to adhere to the surfaces of host particles without the coating particles being sintered, it is immaterial whether the composition of the coating powder is organic or inorganic, crystalline or not, as long as it undergoes no change in physical state. Therefore a coating powder is chosen in which the individual particles are as small as can be obtained, and which do not coalesce during sintering of the coated powder. A preferred coating powder has a particle size in the range from 0.02 $\mu$ to 1 $\mu$, more preferably <0.2 $\mu$.

The $T_g$ of a powder is determined to be the midpoint of a range from the temperature of onset of transition (referred to as the "initial $T_g$"), to the temperature of the completion of transition (referred to as the "final $T_g$"). These initial and final points on a trace (see FIG. 3, described in greater detail below) generated by a differential scanning calorimeter ("DSC") provide evidence of the transitions which are a fundamental physical property of a material. The temperature at onset of transition is so closely related to the "caking temperature" that for all practical purposes, it is essentially the same.

It just so happened that a host powder, mottled by blending it with a chosen coating powder as specified herein, does not coalesce under conditions at which the virgin powder would. This characteristic allows a bed of the mottled particles to be stored at a temperature above the initial $T_g$ or "onset of transition" of the host powder without becoming lumpy due to particles sticking together. Prolonged storage of the coated powder is essential in both, the "feed" cylinder and also the "parts" cylinder of a SLS machine. Such storage is essential in the (i) feed cylinder, because in the best mode, the powder is transferred to the target surface of the parts cylinder at as high a temperature as is practical; and, (ii) parts cylinder because in the best mode of a sintering operation, the unsintered powder is recovered and reused without having become lumpy due to coalescence of coated particles in either bed of the SLS machine.

The temperature at which a sinterable powder can be stored is of particular interest in this invention because it has been found that the higher the storage temperature, the higher the strength of the sintered part in comparison with an identically sintered part of the same powder stored at a lower temperature. The upper limit of the storage temperature is that at which the powder is "sticky" rather than flowable, and cannot be transferred as a powder, and spread in the target area because the powder has "caked". This temperature is therefore referred to as the "caking temperature" or "coalescence temperature".

As will presently be evident, the storage temperature can be substantially higher than the temperature at which transition of the host powder is complete, because the host powder is surprisingly well-insulated by the partial coating of the coating powder, but not for very long. Further, the risk of caking increases quickly as the storage temperature rises above the final $T_g$ of the host material.

A mass of mottled particles is also unique because, after being blended at a temperature above ambient (20° C.–30° C.), the coated powder affords a larger WOS in a SLS machine than afforded by virgin powder.

The '816 patent teaches that "densifying" a sinterable powder is desirable, and various methods are taught as to how this might be accomplished. For example, a powder depositing device is taught which electrostatically charges and dispenses the powder to a target area having a charge opposite to that of the powder. Other examples are provided for densifying a powder of preselected particle size, after the powder is placed in the SLS machine for use.

There is no suggestion in either the '816 or '817 patents that one might start with a partially coated fine powder in which the coating does not melt, particularly a powder in which the bulk density has been increased relative to the powder's original bulk density (that of the powder when produced by the manufacturer), before the powder is placed in the SLS machine; nor is there a suggestion as to how one might maintain the particulate free-flowing condition of the powder, regardless of its bulk density, at or near, much less above, the caking temperature or initial $T_g$.

The problem of distributing a powder with a proclivity to "cake" or "become sticky" was not encountered, and therefore not addressed, in either the '816 or the '817 patents. Referring specifically to the former, it will be appreciated that the powder must be flowable under applied force, if it is to be applied as a layer by using a drum which rotates counter to the direction of its movement across a target area upon which the layer is to be deposited. If the powder "cakes" it becomes lumpy and cannot be spread in a layer less than 80 mesh (about 180 $\mu$ thick), of relatively uniform thickness, such as is necessary to form a selectively laser sintered article.

It would have been logical to add an anti-caking agent, if caking was a problem at a temperature below the initial $T_g$ of the host powder. The function of the anti-caking agent would be self-evident. To prevent the host powder from caking at a temperature above its initial $T_g$, it would be logical to encapsulate the host powder with a coating powder which has a higher $T_g$ than the host. Quite unexpectedly however, when the host powder is only partially coated with the coating powder, and even when coated over only a minor portion of the surface area of the particles of host powder, the coated host powder does not cake above its initial $T_g$ when stored for a prolonged period.

No less unexpectedly, in my invention, the coating powder also aids in densifying the coated powder, hence functions as a "densifier" provided the coating powder is blended with the host powder under high-shear conditions and discharged at a temperature, referred to as the "drop" temperature, in the range from within 20° C. below its initial $T_g$, up to a temperature lower than, but near the final $T_g$ of the host powder, preferably within 2° C. of the final $T_g$. The "drop temperature" is the recorded temperature of the coated powder mass at the end of the mixing period, just prior to the mass being dumped from the mixer, and reflects the energy input.

Such densification occurs mainly because the blended partially coated powder, though not substantially diminished in average particle size, is essentially free of electrical charge.

Since the true specific gravity of most polymer powders is in the range from about 0.6–1.5 g/cc, the bulk density of a polymer powder, even in pellets about 3 mm in avg size, seldom exceeds 1.0 gm/cc. Typically, this is the range of bulk density of the powder feed to an injection molding machine or an extruder, whether the powder is in a size range greater than about 80 mesh, or in the form of pellets as large as about 4 mesh in size, or even larger. Fine polymer powders, that is, no greater than about 177 $\mu$ in average particle size, are not used in either injection molding machines or extruders because there is no advantage to offset the penalty of the much lower bulk density which is typically associated with the fine powder.

The typical host powder <177 $\mu$ has a bulk density in the range from 0.3 to 0.6 gm/cc depending upon the true density of the material and the shapes of the particles. Commercially available PVC powder when comminuted typically has a bulk density in the range from 0.35 to 0.6 gm/cm$^3$; and PC ranges from 0.33 to 0.55 gm/cm$^3$.

From the foregoing it will now be evident that the partially coated powder of this invention is specifically tailored for use in a SLS machine when it is operated by following steps consistent with those outlined hereinafter.

It is self-evident that 'fines' can increase the bulk density of a polymer powder by filling interstices between the coarser particles. It is also known that fines can actually increase the bulk density of resins in a compacted state, if the necessary compaction is not frustrated by static charge effects. It is equally self-evident that it will not be efficient to feed a fluffy mass of very fine particles to the target area of an SLS machine, just as it would be inefficient for an injection molding machine or extruder because of bridging, air entrapped in the powder, and still other reasons.

Yet, it is efficient to feed very fine and fluffy particles (e.g. Hi-Sil) for the specific occasion when it is desirable to provide a feed of thoroughly mixed powders in a mass in which the host particle size is in the range from 1 $\mu$–177 $\mu$, for the purpose of forming a laser-sintered article without sacrificing the relatively high bulk density of a mixture of the coarse powders (because of the mixture's ability to self-pack densely), or, its good particulate flow characteristics.

The prior art relating to finely divided powders, having particles <180 $\mu$, being blended for the specific purpose of densifying the powder, is strangely silent as to how this might be accomplished. Pellets and very coarse powder have been reduced to a smaller particle size by shearing the solid particles at low shear, in a mixer maintained at elevated temperature. But the bulk density of the comminuted, prior art particulate mass was typically decreased and not increased because the input of mixing energy at low shear was insufficient. By "low shear" I refer to an energy input of less than about 30 watt-hr per lb of powder, but preferably in excess of about 1 watt-hr/lb of powder, a greater energy input than the former (30 watt-hr/lb of powder) being referred to as "high shear". It will be appreciated that the precise quantum of energy required to provide "high shear" mixing of powders is not quantified critically, but will depend to some extent upon the particular sizes of powder mixed, and also the morphological characteristics of their compositions; and, that slightly less than high shear conditions may provide some, but not optimum densification.

By and large, one skilled in the art, faced with the problem of providing a dense, fine powder of a coated polymer essentially free of static electric charge and having a bulk density which is at least as high as that of the virgin polymer in a coarser particle size, resorts to crystallizing, precipitating, or otherwise re-conditioning the coarse powder into as fine a powder as will not significantly decrease its bulk density from before it was coated. One simply does not comminute the coarse powder with an anti-caking or densifying coating powder, with the expectation that the resulting finer, partially coated powder will substantially maintain the bulk density of the starting coarse powder and be free of electric charge.

The reason is that most polymer powders are essentially non-conductive, and comminution of the powder by any comminuting means, particularly a metal blade means, generates a significant level of a static charge which affects both the flow and the packing characteristics of the powder. Static is a dynamic property. Static is generated during the movement of powders, for example, as it is being discharged from a conduit. The rate at which the static is generated is dependent upon the conductivity of the powder and the grounding of the system.

Therefore the performance properties of powders, and in particular, their resistance to caking and self-packing, both of which are affected by static, are also dependent upon their history and the inherent properties of the powders themselves, particularly particle size, shape and uniformity. See "The Powder Properties of Poly(vinyl chloride) Resins" by Paul R. Schwaegerle, ANTEC '84, p 824. Conditioning the powder at a relative humidity of 50% or greater, effectively countered and negated the static charge provided the powders were allowed enough time to recover their original flow and packing characteristics. No other suggestion was made as to how to negate the effects of the static charge build-up.

The facility with which one may maintain a coated-/uncoated powder flowable under applied force, which powder does not exhibit caking, and without decreasing the bulk density of the partially coated powder after it has been comminuted, is progressively exacerbated if a component of the coated powder is organic, and the coated powder is then to be maintained at elevated temperature, particularly one approaching or exceeding the initial $T_g$ or caking temperature of the host material, but below its final $T_g$.

Because a coarse powder (or pellets) having relatively high bulk density is typically free-flowing, there is no reason to coat either the coarse powder or the pellets with an anti-caking agent, or otherwise coat or encapsulate them. But the desirability of a fine powder having relatively high bulk density, yet which flows under applied force, and is resistant to caking at or above the initial $T_g$ of the powder, is of utmost interest in a method for sintering the powder with a laser to produce as dense a porous article of arbitrary shape as can be made.

SUMMARY OF THE INVENTION

It has been discovered that a relatively fine powder of a synthetic resinous material ("host polymer powder" or "host powder") having an average particle size less than about 177 $\mu$, and an initial $T_g$ higher than 50° C. may be densified by partially coating the host powder with a coating powder in a mixer by blending under specified conditions. The blending temperature is such that coated powder is discharged from the blender at least 5%, preferably more than 10% denser than that of the starting host material, and at a "drop" temperature from above (initial $T_g$−20° C.) of the host powder, but below its final $T_g$. The coated powder is discharged when the desired "drop" temperature is reached, as illustrated in Table I, below.

The particles of coating powder are preferably in the range from 0.02 $\mu$ to 0.2 $\mu$ and always smaller than those of the host powder, so as to form "mottled" particles of coated powder which are essentially free of static charge, have an unexpectedly high bulk density, are storable and flowable at a storage temperature above the initial $T_g$ of the host powder, and present a WOS peculiarly adapted to the requirements of a selective laser sintering (SLS) machine. Such mottled particles, blended and discharged at the specified drop temperature, are unique in that they are storable at a temperature as high as the final $T_g$ of the host powder. The mottled particles are therefore stored in the range from the initial $T_g$ of the host powder, up to near the final $T_g$ of the host.

The only exception known at the present time, is commercially available PVC which, when partially coated with a coating powder may be stored at a temperature as high as 42° C. above its final $T_g$ as demonstrated in Table II below. Mottled particles, blended and dropped at a drop temperature in the range from above ($T_g-20°$ C.) but below the final $T_g$, remain flowable under applied force, and are laser-sinterable into a porous solid mass which is more dense than another mass identically sintered from a coated powder with an ambient drop temperature of 30° C., provided the mottled particles are sintered in a target bed held at a temperature in the range from as low as 3° C. above the initial $T_g$, but below the final $T_g$, as near as 2° C. from the final $T_g$ of the host powder.

It is therefore a general object of this invention to provide a sinterable mass of powder comprising, mottled particles essentially free from static charge, of a host powder having an average particle size in the range from about 1 $\mu$ to 177 $\mu$, coated with coating particles in the size range from 0.02 $\mu$–44 $\mu$ but having an average size smaller than that of the host powder, which mottled particles are flowable under applied force from 5–500 g-force, and storable at a storage temperature above the initial $T_g$ of the host powder, but below its final $T_g$, and below a temperature at which the mottled particles are sinterable; and, to provide a process for producing a mass of such mottled particles.

A substantially amorphous thermoplastic host powder having a $T_g$ which ranges from initial to final, over at least 3° C. and preferably over 50° C. is densified by dry-blending with a coating powder at an elevated temperature sufficient to discharge coated powder at a drop temperature higher than the initial $T_g$ of the host powder, but below its final $T_g$. By "substantially amorphous" reference is had to a material which is generally regard as being amorphous but may have some crystallinity, up to about 10%. Particles of the coating powder fail to coalesce one with another, but adhere to the surfaces of host particles so as to render the host powder caking-resistant even at a temperature above its initial $T_g$.

The virgin host powder is blended and dropped at elevated temperature in the range specified, with from about 0.01 to about 20 phr (part by weight per 100 parts by weight of virgin host powder), preferably from 0.05 to about 5 phr, of a coating powder selected from the group consisting of hydrated silica, amorphous alumina, glass-forming inorganic compounds such as glassy silicates, phosphates, borates, and oxides, and crystalline materials such as titanium dioxide, talc, mica, fumed silica, kaolin, attapulgite, calcium silicate and magnesium silicate, all having a primary particle size less than 10$\mu$, preferably less than 1 $\mu$, and a m pt or $T_g$, depending upon whether the coating powder is crystalline or amorphous, higher than the final $T_g$ of the host polymer powder, preferably at least 20° C. higher. The powder is densified by blending with an input energy of at least about 30 watt-hr/lb, and discharged at a "drop" temperature from (initial $T_g-20°$ C.) to above the initial $T_g$ of the host powder, but lower than the final $T_g$ of the host powder.

Further, a mechanical-thermal process has been discovered in which a relatively fine powder of a "host polymer powder" or "host powder" having a predetermined initial bulk density, is subjected to "high shear" at elevated temperature below the final $T_g$ of the host powder, in the presence of a finely divided coating powder, and preferably, a thermooxidation ("TO") stabilizer, and a lubricant, to produce a coated powder smaller than 177 $\mu$, which coated powder is not only essentially free of static electricity and free-flowing at a temperature above its initial $T_g$, but also has a bulk density in the range from 0.4 to 1.0 g/cc which is at least 10% higher than the initial bulk density of the virgin (uncoated) host powder.

It is therefore a general object of the invention to provide a process for densifying a virgin host powder of synthetic resinous material, comprising, dry-blending the powder having a particle size in the range from about 1 $\mu$–177 $\mu$, with a coating powder having a particle size in the range from about 1 $\mu$–44 $\mu$ and smaller than the host powder, a bulk density in the range from 0.15 to 0.35 and lower than that of the host powder, and, a $T_g$ or m pt at least 10° C. higher than the final $T_g$ of the host powder, by subjecting the host and coating powders to high-shear mixing with an input energy of at least about 30 watt-hr per lb of the powder, at a temperature in the range from about 20° C. below the initial $T_g$, but below the final $T_g$ of the host powder, preferably in the presence of a to stabilizer and a lubricant, and recovering a blended, coated powder of particles more rounded than those of the virgin powder. The coated powder recovered is free of electric charge, flowable under applied pressure, without caking at a temperature above the initial $T_g$ of the host powder, and has a blended bulk density greater than the initial bulk density of the virgin host powder.

It is another specific object of the invention to provide the foregoing densified, electrically uncharged, caking-resistant and flowable powder as a feed for a SLS machine in which the powder is forcibly flowed as a thin layer onto a target surface, with a rolling drum exerting in the range from 5 g-force to about 500 g-force, then subjected to a laser of sufficient energy to generate a temperature within a WOS, at least 10° C. above the initial $T_g$ of the host powder but below the final $T_g$ of the host powder, to effect sintering without causing flow in the mass of coated powder not laser-sintered on the target surface.

It is still another specific object of this invention to prepare a caking-resistant, simultaneously mechanically and thermally densified, coated powder, essentially free of a static electric charge, with a partial coating over only a minor portion of the surface of the particles of host powder, which partial coating permits sintering with a laser beam in a temperature WOS larger than that afforded by uncoated host powder. The laser generates as high a temperature as will provide the interparticle viscous flow which characterizes sintering of individual monolayers sequentially, and autogenously densifies the sintered body which is denser than the bed of mottled particles in which the body was formed.

It is yet another specific object of this invention to produce a sintered porous body from a host powder having an initial $T_g$ at least 3° C. below its final $T_g$ and preferably from 5° C.–20° C. below its final $T_g$, partially coated with a coating powder which not only renders the coated powder storable and flowable at above the initial $T_g$ of the host powder in the target bed of a SLS machine, but also provides the coated powder with an unexpected increase in bulk density at least in part due to the coated powder being essentially free of a static electric charge; the densified powder, in turn, permits formation of a denser laser sintered body than is formed with virgin host powder. Such formation of a denser sintered body of preferred relatively high-temperature materials having a $T_g$ ranging from initial $T_g$ to final $T_g$, from 10° C. to about 40° C. or even more, occurs in a WOS from at least 5° C., and preferably more than 20° C. above the initial $T_g$ of the virgin powder, and up to within 2° C. from the final $T_g$, without melting the powder particles in the body. The now-usable higher temperature in the WOS causes enhanced viscous flow between contiguous coated powder particles in each monolayer and a contiguous monolayer, while forming the laser-sintered body.

BRIEF DESCRIPTION OF THE DRAWING

The foregoing and additional objects and advantages of the invention will best be understood by reference to the following detailed description, accompanied with schematic illustrations of preferred embodiments of the invention, in which illustrations, like reference numerals refer to like elements, and in which.

DETAILED DESCRIPTION OF PREFERRED EMBODIMENTS

Of special interest among the properties of a polymer powder for a SLS machine, is how finely divided polymer powders flow (powder rheology) and how they pack (bulk density). These properties in turn are affected by the particle geometry (size, shape, surface, and porosity), electrostatic forces present, and the degree of interaction of the foregoing which result in varying compaction. For example, one cannot predict by calculation, how much anti-caking coating powder is required to cover a particular portion of the surface of particles of a host powder, because the particles of anti-caking coating powder do not coat the host particles evenly, but in clumps, depending upon the morphology of both, the host and coating particles. The amount of coating powder on mottled particles ranges from about 0.1 to 20 parts by weight, based on 100 parts by weight of the mottled particles.

The invention will be particularly described with respect to its use to prepare a coated powder feed for the SLS machine in which both the forced flow of powder and how it packs under slight force (say, pressure), are of paramount importance.

In its essential parts, a preferred embodiment of the SLS machine comprises a pair of vertical cylinders, the first a feed delivery cylinder, and the second a target cylinder, in parallel slightly spaced-apart relationship. The feed cylinder thrusts a mound of polymer powder up before a rotating drum which discharges the powder onto the surface of the target cylinder while rolling over it (the target cylinder), forming a thin layer of uniform thickness on the target surface. Because the layer is typically less than 1 mm thick, it is essential that the powder be free-flowing, rather than lumpy due to particles sticking to one another.

A laser beam, controlled in intensity, is directed in a preselected pattern by appropriate control means to sinter the topmost layer of deposited powder in the target bed which is held in a nitrogen atmosphere with less than 2% oxygen to avoid discoloration, to maintain an essentially inert atmosphere, and to minimize distortion of sintered parts. The control means includes a computer which determines the boundaries of each cross-section of the part to be formed as it sinters that cross-section. By sintering a large number of controlled cross-sections of deposited layers sequentially, the entire part is produced.

It will now be evident that the more densely the powder is packed onto the target surface, and the more dense the individual powder particles, the more dense will be the sintered part produced. It will also be evident that the part produced will always have residual porosity, but the goal is to minimize the porosity without melting entire particles of the polymer powder, because, if melted, the definition of the produced part at the boundaries is lost.

Rather than coat a host material with a coating powder to lower the temperature at which sintering occurs (that is, to lower the sintering temperature below the $T_g$ of the host material), as suggested by the '817 patent, I seek to do the opposite, namely, to increase the temperature at which sintering occurs (to a temperature above the initial $T_g$ of the host powder). I also seek to store the coated powder in the target area of the SLS machine at a bulk density higher than the virgin powder's original bulk density, and, at a temperature near or above its initial $T_g$ but below its final $T_g$ without permitting the coated powder to cake, or, noticeably sacrificing its flowability under applied force.

This invention, in one embodiment of its best mode, utilizes a relatively high $T_g$ host powder, referred to as a "high-softening" thermoplastic powder which may have a $T_g$ as high as about 300° C. Such high-softening thermoplastic polymers are exemplified by poly(phenylene oxide) (PPO), blends of PPO with other polymers, specifically PPO/styrene, and polycarbonate (PC). Lower $T_g$ polymers may be used, for example, a terpolymer of dicyclopentadiene/methyltetracyclododecane/methylnorbornene which has a $T_g$ of about 50° C. A commonly used host powder is commercially available substantially amorphous PVC having an initial $T_g$ of about 65° C. and a final $T_g$ of about 88° C.

A preferred coating powder is a colloidal silica dispersion, preferably amorphous hydrated silica, commercially available as Hi-Sil from PPG Industries, as an anti-caking coating powder for coating. When used in small amounts, preferably in the range from about 0.02 to about 2.5 phr (parts per 100 parts of host powder), the submicron from 0.02 to 0.2 $\mu$particles of silica, or other comparably small <1 $\mu$ particles of coating powder, partially coat the surface area of the host powder particles, preferably a major portion thereof, not only providing the anti-caking effect desired, but effecting the desired densification of the powder when it is subjected to high shear mixing. Even more surprisingly, the colloidal silica somehow negates the expected buildup of an electrostatic charge on the powder.

The amount of coating (of coating powder) used to partially coat the larger host particles ranges from about 0.05 to 10 phr, depending upon the relative size of the particles of host and coating powders, more preferably from 0.5 to 5 phr. In those instances in which particles of the coating powder are not very much smaller than those of the host powder, as much as 40 phr of coating powder may be used to partially coat host particles. This may occur, for example, when 100 phr of 177 $\mu$ polystyrene or poly(methyl methacrylate) (PMMA) particles are blended with 30 $\mu$ PC particles; or, when 100 phr of 88 $\mu$ PC powder is blended with 20 phr of 44 $\mu$ PBT powder.

Thus, depending upon the average particle size of the host powder and the relative primary particle size of the coating powder, from 0.02 phr to about 40 phr, preferably 0.1 to 20 phr, of coating powder may be used to partially coat particles of the host powder. Typically less than 50% of the area of the particles of host powder, and generally from about 10% to about 40%, is coated with coating powder.

The flowability $\mu K$ (or 'powder friction'), and the sustaining strength (F) of various mixtures mixed under high shear conditions was determined using a simple "draw-plate" technique referred to above. Basically the test is performed by measuring the force required to withdraw a plate from a cylindrical bed of powder. The drawing force required is measured and plotted as a function of time. The maximum drawing force is a measurement of the sustaining strength of a powder bed. The drawing force profile is then related to $\mu K$ of powders as a function of packing, where is the coefficient of friction of powder against the solid drawing plate, and K is Janssen's constant, an anisotropic pressure distribution factor for a powder bed.

The tendency to cake is measured by placing a glass graduate cylinder about one-third full of powder in an oven at different temperatures, typically two temperatures, one below, the other above the $T_g$ for 16 hr. A powder with poor caking resistance will form a cake which is difficult to break up by vigorously shaking the graduate. A powder with good caking resistance will be easily broken up with shaking, indicating that substantially all the individual particles maintain their individuality.

The following Table I identifies six samples of a PVC powder (PT-18 SA 3926) in which the individual granules have an average particle size (number average diameter) in the range from about 25 $\mu$ to 80 $\mu$. For blending at elevated temperature, 100 parts by wt of host powder, preheated to a predetermined jacket temperature of the Henschel mixer, are blended with 1.66 parts of a stabilizer, for example, a commercially available organo-tin compound, and 0.67 part of two types of Hi-Sil, one having a particle size of 0.02 micron, the other a particle size in the range from 0.08 to 0.12 micron. Blending is done in a Henschel Model FM10LA mixer equipped with a heating jacket and a 1 HP motor capable of driving a four-bladed impeller at speeds in the range from 1800 rpm to 3600 rpm. The temperature at which blending is done is varied to provide different desired drop temperatures, but the time of blending and rpm (3490) of the blades, is the same, so that all samples are made with the same input of energy, namely, 110 watt-hr/1.5 kg.

TABLE I

| Sample | Hi-Sil part. size ($\mu$) | Jacket Temp. °F. | Drop Temp. °F. | Bulk dens. g/cc |
|---|---|---|---|---|
| 1878C | none | 160 | 165 | 0.395 |
| 1878K | none | 105 | 120 | 0.368 |
| 1878D | 0.08–0.12 | 86 | 123 | 0.370 |
| 1878E | 0.08–0.12 | 160 | 174 | 0.410 |
| 1878F | 0.02 | 87 | 122 | 0.377 |
| 1878G | 0.02 | 160 | 160* | 0.468 |

*drop delayed

The foregoing density data in Table I demonstrate that blending at elevated temperature, whether the drop temperature is above or below the initial $T_g$ of 65.2C (149° F.) (see FIG. 3) of the host PVC powder, results in a higher bulk density than the initial bulk density.

The following data in Table II illustrate the effect in each of the foregoing examples, of a partial coating of Hi-Sil particles on the host powder, insofar as the caking resistance of the powder has been modified by the insulating effect of the Hi-Sil particles.

TABLE II

| Sample | @ 130° C. | @ 140° C. |
|---|---|---|
| 1878C | poor | poor |
| 1878K | poor | very poor |
| 1878D | fair | poor |
| 1878E | fair | poor |
| 1878F | good | good |
| 1878G | good (best) | good (best) |

In an analogous manner the PVC powder is coated with an organic crystalline polymer, specifically nylon 11 having an average particle size of 30 $\mu$, used in the amount of 10 phr melting in the range from 168°–199° C. The host PVC and nylon 11 coating particles are blended at 70° C. under high shear conditions and discharged at a drop temperature of 80° C. which is below the final $T_g$ of the nylon 11. Densification of the coated powder more than 10% higher than the bulk density of the host PVC is achieved and it is believed the coated powder could be held at about 125° C. for 16 hr without caking though no measurements were made.

The foregoing data demonstrate that the effect of providing a partial coating of the Hi-Sil by blending, whether the drop temperature is below or above the initial $T_g$, improves caking-resistance so much that either powder can be held at a temperature at least 40° C. above the final $T_g$ for as long as 16 hr, though the caking resistance is better in some samples.

Figure 1A:
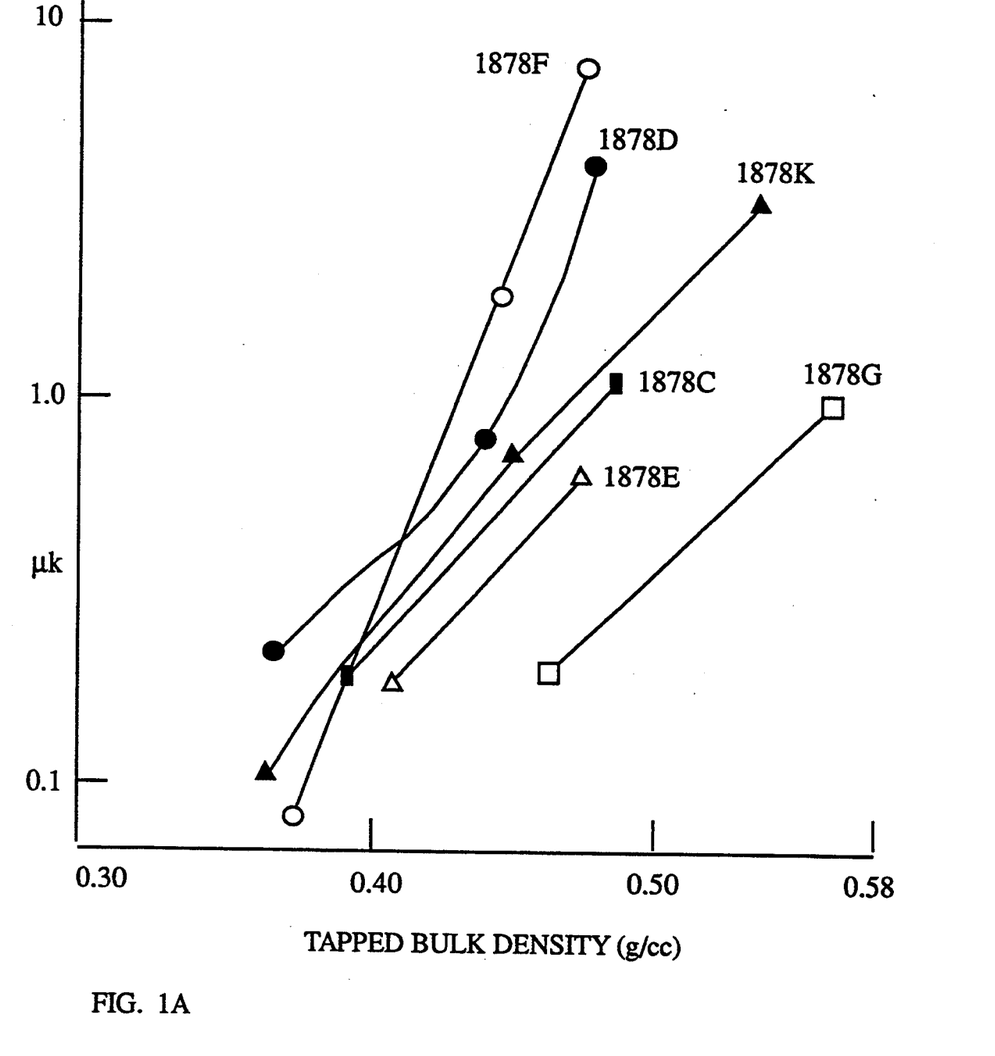
FIG. 1A is a graph plotting the flowability $\mu K$ (a measure of the degree to which the powder has caked) of solid PVC particles against the tapped bulk density $\delta_b$ of the blended powder for various conditions of mixing in a jacketed Henschel "high-shear" mixer.

The tapped bulk densities of the samples were measured and a draw-plate measurement was made at each tapped bulk density. FIG. 1A shows $\mu K$ as a function of tapped bulk density for each of the samples made under high-shear mixing conditions. The control samples are 1878C and 1878K. The plot shows that the combination of flowability and high tapped bulk density is best for 1878G which was mixed using the method of this invention. The $\mu K$ for each of the control samples shows that $\mu K$ for each increases at about the same rate as that for 1878G, but the tapped bulk density for the control samples is undesirably low. The other samples mixed at low temperature show that $\mu K$ for each increased sharply though tapped bulk density remained about the same as in the control sample. In each case, $\mu K$ increases substantially over a small increase in tapped bulk density.

Figure 1B:
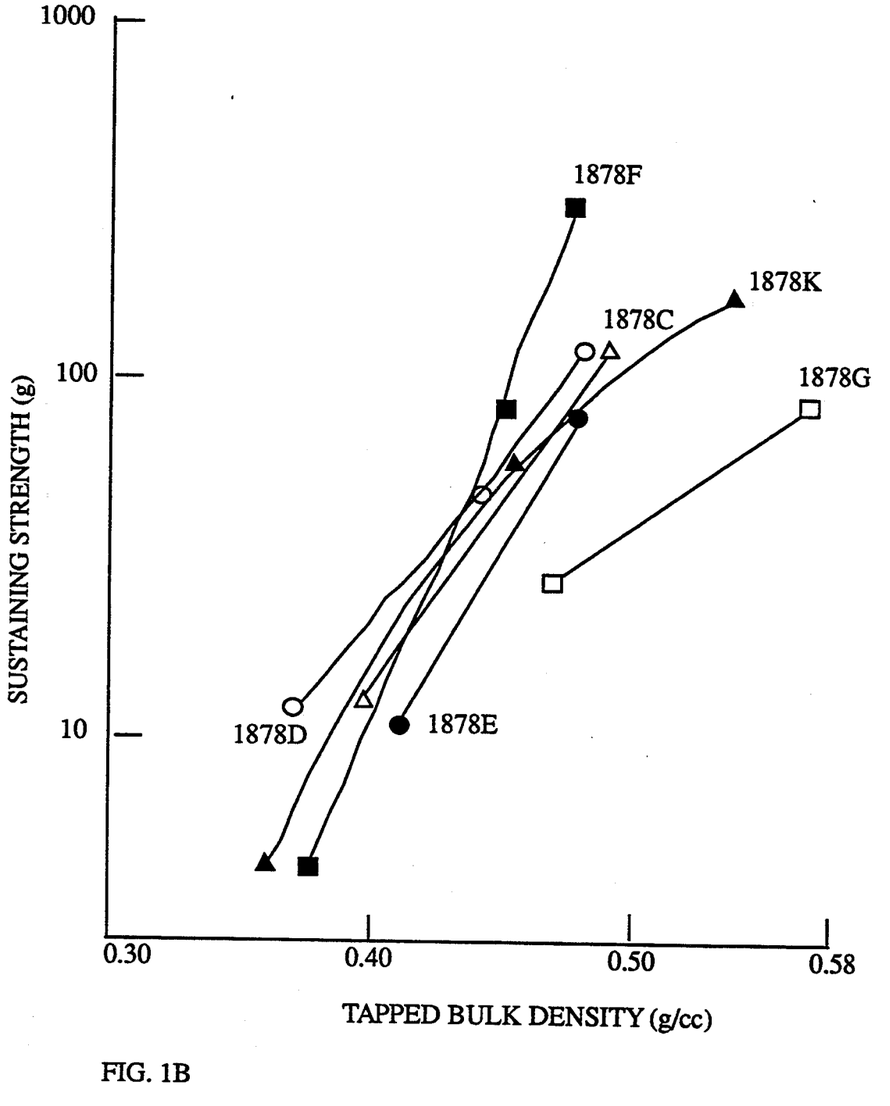
FIG. 1B is a graph plotting sustaining strength (F) of each of the mixtures of solid particles vs. the tapped bulk density of those mixtures, each of which was compounded with high shear mixing under different conditions.

FIG. 1B shows a plot of sustaining strength (F) for each of the several high-shear mixed samples and plotted against the tapped bulk density of each. The curves for all samples except that for 1878G, have about the same slope and are within the about the same range of tapped bulk density 0.38 to 0.48. Only 1878G shows increased bulk density without substantial increase in sustaining strength. Moreover the spread of sustaining strength over the range of increased bulk density realized in 1878G appears significantly less than the spread for the other samples. Since high sustaining strength is correlatable to a greater applied force required to effect flow of the powder, it is preferred to maintain the sustaining strength in the range from about 10 g to about 100 g, in which range the powder is essentially free-flowing under applied force. In each case sustaining strength increases substantially over a small increase in tapped bulk density.

This change in bulk density cannot be explained by the contribution of the very small amount of added Hi-Sil particles which have a true density of 1.8 g/cc. FIGS. 1A and 1B further indicate that powder 1878E and 1878G, prepared according to this invention, have the combined properties of free-flow, (that is, low $\mu K$ and low sustaining strength), and improved bulk density, desirable for the SLS process.

To demonstrate densification by blending within 20° C. of the initial $T_g$, a commercially available substantially amorphous PC, Dow's Calibre 200 Natural PC powder smaller than 100 μm (140 mesh) was used. This PC is not available in the next larger size range for use in a SLS machine. A size range which includes 20 mesh material (or any material larger than 177 μm) cannot be used in the SLS machine.

Though the measured initial $T_g$ of the PC prior to size reduction is 131.3° C. (268° F.), and the final $T_g$ is 170.1° C. (338° F.) it is found that, after size reduction, it has so little caking resistance at 110° C. (230° F.) that this is the maximum drop temperature at which uncoated Wedco-reduced PC powder can be discharged without substantial agglomeration.

A procedure of blending, analogous to that described hereinabove, was repeated with finely ground particles (made by Wedco size reduction) of 100 parts of the PC blended with 0.67 phr Hi-Sil (or none) having a primary particle size of 0.02 μ. The "as received" room temperature tapped bulk density of the PC is 0.36 gm/cm$^3$. 1500 gm of the PC are blended with 10 gm of Hi-Sil in a high-shear Henschel mixer. The proportion of Hi-Sil to PC powder is 10/1500=0.006. The true density of the PC is 1.2 g/cc and the true density of Hi-Sil is 1.8 g/cc. The theoretical bulk density of the blended powder is 0.362 g/cc, and as one would expect, is essentially the same as that of the unblended PC.

In the following experiments, two uncoated samples of PC powder 1995A and 1995B were mixed in a Henschel mixer set for high-shear, for 3 min at 21° C. (room temperature) and 100° C. (controlled by using different jacket temperatures) and discharged at drop temperatures of 21° C. and 97° C. respectively. A third sample, 1995D was blended with 0.67 phr parts of 0.02 μHi-Sil by blending at 110° C., the maximum temperature before stickiness set in.

In example 1995D the drop temperature was 113° C. (230° F.), which is nearly 20° C. below the initial $T_g$ of the virgin PC powder, but the blend was acceptable because the densification obtained was satisfactory. The PC powder is observed under an optical microscope to be only partially coated. The blended powder was free-flowing at room temperature.

The various mixing and drop temperatures for each of the foregoing samples of uncoated and coated PC powder are set forth in the following Table III.

TABLE III

| Sample | Hi-Sil 0.02μ | Jacket Temp. °C. | Drop temp °C. | Bulk Dens. gm/cm$^3$ | Increase in-dens. |
|---|---|---|---|---|---|
| 1995A | none | 21 | 21 | 0.38 | reference |
| 1995C | none | 100 | 97 | 0.47 | 24% |
| 1995D | 0.67 | 110 | 113 | 0.56 | 47% |

From the foregoing data it is evident that simply mixing in the Henschel mixer at high-shear even at room temperature shows a slight improvement of the bulk density. High-shear mixing at 100° C. of uncoated PC powder, by itself, and a drop temperature of 97° C., provides an unexpected increase of 24% in bulk density. When the host powder is coated with Hi-Sil by blending at 110° C., sample 1995D shows that a drop temperature about 20° C. below the initial $T_g$ of the PC provides even further densification, about 47% higher than the uncoated PC powder blended at room temperature. This densified powder is surprisingly far more dense than one would expect from a calculation of the theoretical improvement in density due to the presence of the stated amount (0.67 phr) of Hi-Sil. The blended bulk density of 0.56 gm/cm$^3$ is more than 50% denser than the "as received" powder (density 0.36 gm/cm3).

The caking-resistance of the samples made was evaluated at different temperatures each above the initial $T_g$ of 131.3° C. but below the final $T_g$ of 170.1° C. of the host PC powder. The results are presented in the following Table IV.

TABLE IV

| Sample | @ 140° C. | @ 150° C. | @ 160° C. |
|---|---|---|---|
| 1995A | fair | poor | very poor |
| 1995C | fair | poor | very poor |
| 1995D | good | good | good |

In an analogous manner the PC powder is coated PET, an organic crystalline polymer having an average particle size of 30 μ, used in the amount of 10 phr melting in the range from 245°–260° C. The host PC and PET coating particles are blended at 130° C. under high shear conditions and discharged at a drop temperature of 140° C. which is below the final 265° C. m pt of PET. Densification of the coated powder more than 10% higher than the bulk density of the host PC is achieved and it is believed the coated PC powder could be held at about 140° C. for 16 hr without caking though no measurements were made.

From the foregoing data it is evident that for sample 1995D the caking resistance is good and remains so over the range from 140°–160° C. which is above the initial but below the final $T_g$ of the host PC powder.

The initial and final $T_g$s of a powder are determined in a conventional DSC into which a 10 mg sample is placed on an aluminum pan. The DSC trace shown in FIG. 3 results from a standard procedure in which, starting at room temperature, indicated by reference numeral 1 on the trace, the sample is heated so as raise its temperature at the rate of 20° C./min. It is seen that the trace is substantially horizontal until at point 2 it deviates from the base line being generated. This point 2 is defined as the initial $T_g$.

Figure 3:
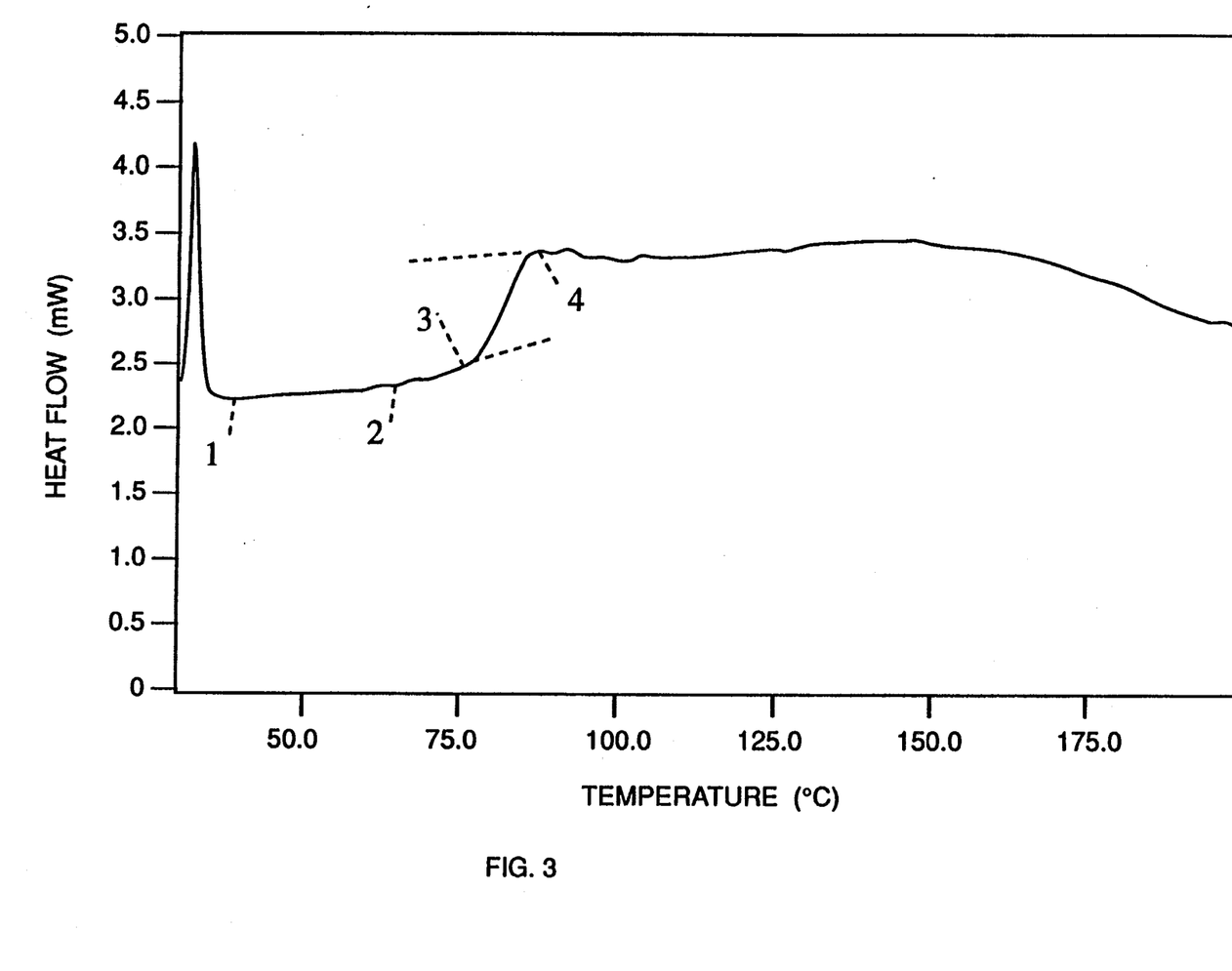
FIG. 3 is a typical scan of a differential scanning calorimeter (DSC) used to measure the $T_g$ of a powder.

As the sample continues to be heated, its temperature begins to rise quickly at point 3 as the trace moves up towards the final $T_g$ at point 4, defined as such because it is the point at which the trace begins to flatten out. The range of transition is defined as the difference in temperatures of the initial and final $T_g$s.

Figure 2A:
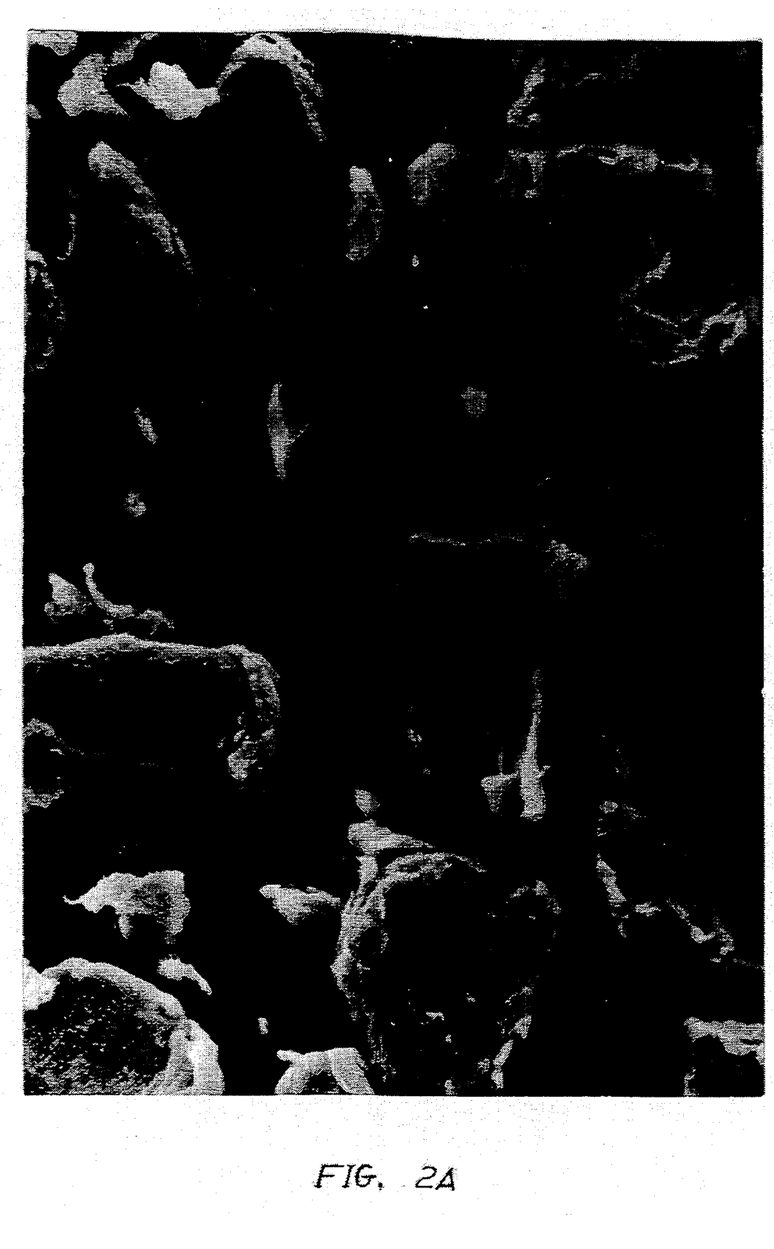
FIG. 2A is a photomicrograph of a powder of unblended virgin Calibre ® Natural (Dow Chemical) PC polycarbonate particles.
Figure 2B:
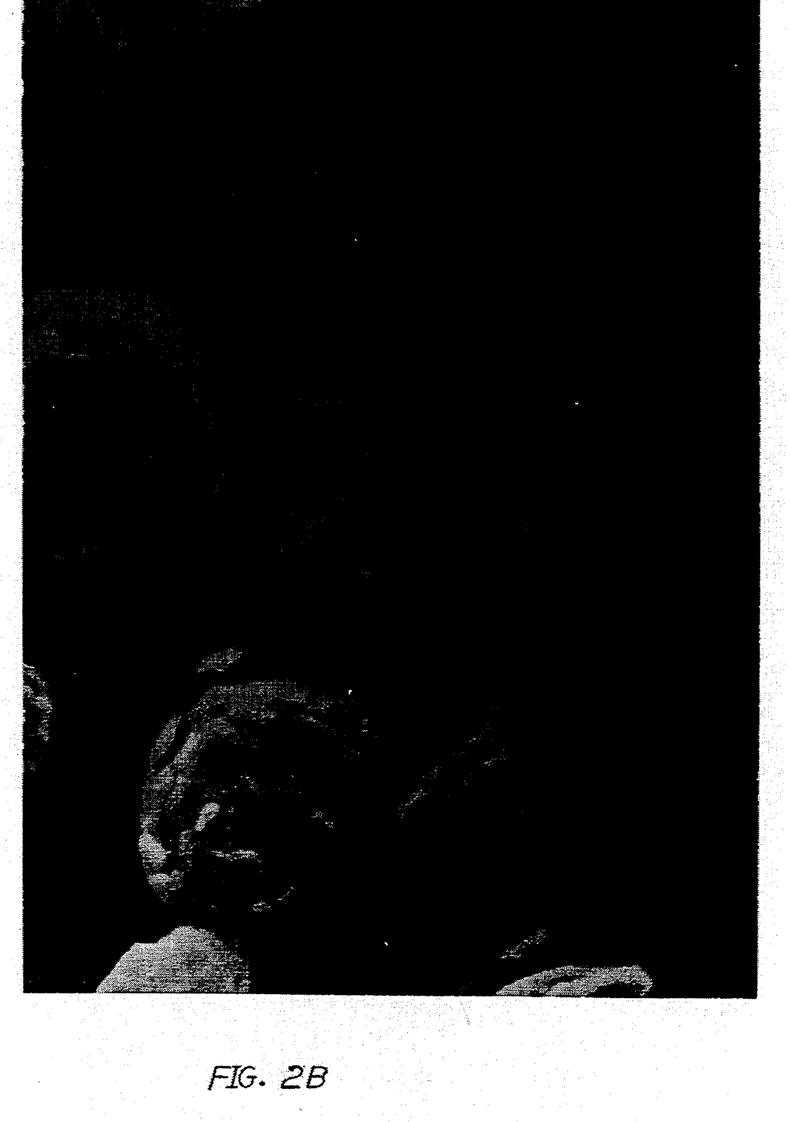
FIG. 2B is a photomicrograph of a machine-comminuted densified powder blended with 0.67 phr of an inorganic solid, sub-micron anti-caking agent.

The number average diameter and the weight average diameter of the samples, before and after mixing were measured. There was no significant size reduction, but photomicrographs of the unblended virgin powder presented as FIG. 2A, and of the blended powder presented as FIG. 2B, showed that there were far fewer particles with jagged profiles in the blended samples. This indicates that the blending had a "rounding effect" on the particles. This effect is thought to contribute to the improved flowability and caking resistance of the coated powder.

Depending upon the choice of the polymer particles of host powder, and also that of the anti-caking coating powder, the blending of the powders results in a mottled powder having a bulk density in the range from about 0.4 to about 1.0 g/cc. As might be expected, the density of the sintered porous body formed with the mottled particles will also vary widely with the choice of the materials and sintering conditions, typically resulting in a porosity in the range from about 0.1 to about 0.5, preferably less than 0.3.

When the host powder is a thermoplastic substantially non-crystalline powder (average particle size less than 105 $\mu$) of PVC, PMMA, polystyrene, polycarbonate, polycarbonate/nylon alloy, polycarbonate/polyester alloy, ABS copolymer, ABS alloy, ABS/nylon, ABS/PVC, acrylics, acrylic copolymers, polysulfone, polysulfone/ABS alloy, polyetherimides, polyamide-imides, polyarylates, fluoropolymers, PPO/polystyrene blend, poly(phenylene sulfide) "PPS" and the like, and the coating powder is an inorganic solid having an average particle size smaller than 44 $\mu$, preferably less than 2 $\mu$, and a $T_g$ or m pt, depending upon whether it is amorphous or crystalline, higher than 200° C., up to about 1800° C., the mottled powder has a bulk density in the range from about 0.4 to about 0.8 g/cc. The relatively low bulk density is attributed mainly to the polymer particles not being substantially spherical. Sintering sequential layers of mottled powder results in a porous body having a porosity in the range from about 0.2 to about 0.7, and one having a density as high as 0.95 if the densified powder is sufficiently dense.

The following examples listed in Table V illustrate the results obtained with PVC having an initial $T_g$ of 65° C. and a final $T_g$ of 88° C.; 100 parts of the PVC, if blended, is blended with either 0 or 0.6 phr Hi-Sil. Less than all the coating powder used, remains on the surfaces of the coated particles. The drop temperature for each example is listed, as is the appraisal of the acceptability of the sintered part formed from the powder used. The sintered article is acceptable if the density is substantially higher than the density of a part form from a less dense powder. The form of the sintered article is acceptable if its laser-scanned dimensions are essentially the same as the defined boundaries of that article as defined by the data in the CAD/CAM system's data base.

The bulk density of the densified powder may range as high as about 65% over the initial, depending upon the bulk density of the host powder, and the true density of the coating powder. The densified powders are used to form a "scoop" for removing powder from a big drum, as a prototype part in a SLS 125 ModA machine. The laser used was a $CO_2$ laser operating at a power level of about 15 watts. Both the feed (powder bed) cylinder and the target area in the SLS machine are heated with radiant heating means to maintain the designated temperatures.

TABLE V

| | Effect of Surface Coating on Sintered Part of PVC** host powder | | | | | | |
|---|---|---|---|---|---|---|---|
| Ex. | Coating Hi-Sil phr | Drop temp °C. | Powder Bed temp °C. | Target temp▲ °C. | Bed dens g/cm³ | Sintered dens g/cm³ | Acceptable Yes/No |
| 1 | 0 | NB* | 50 | 125 | 0.50 | 0.75 | No |
| 2 | 0 | NB* | 60 | 50 | 0.45 | 0.74 | No |
| 3 | 0.6 | 30 | 50 | 120 | 0.58 | 0.53 | No |
| 4 | 0.6 | 30 | 80 | 125 | 0.58 | 0.55 | No |
| 5 | 0.6 | 85 | 60 | 130 | 0.6 | 0.85 | Yes |

*NB = no blending
**Geon$^R$ 87241, 80$\mu$
▲ refer to Table II which shows fair-good coating resistance In ex 1 of Table V, the WOS =(the target bed temp-)—(the initial $T_g$ of the host PVC powder), that is, 125°-65°=60° C. Though the WOS for uncoated host powder is large, the part formed is dimensionally unacceptable because the bed density is too low. In ex 2 of Table V, the uncoated powder is held at a target bed temp below the initial $T_g$ therefore there is no WOS. Under such conditions the bed density is immaterial.

In ex 3 of Table V, for the coated powder, the target bed temp is 120 so the WOS is 55° C., and the bed density is 0.58 which is desirably high, but the part is unacceptable because the drop temperature was too low.

In ex 4 of Table V, for the coated powder, the target bed temp is 125° C. so the WOS is 60° C., and the bed density is 0.58 but the part is unacceptable because the drop temperature was too low.

In ex 5 of Table V, for the coated powder, the target bed temp is 130° C. so the WOS is 65° C., and the bed density is 0.6. The part is acceptable because the drop temperature is 85° C. which is above the initial $T_g$ but below the final $T_g$.

In the following particular instance of PC (initial $T_g$ is over 100° C.) coated powder (0.67 phr Hi-Sil blended) used in examples 8-10 in Table VI below, only about 30% of the PC powder surface is coated with Hi-Sil.

TABLE VI

| | Effect of Surface Coating on Sintered Part of PC** host powder | | | | | | |
|---|---|---|---|---|---|---|---|
| Ex | Coating Hi-Sil phr | Drop temp °C. | Powder Bed temp °C. | Target temp °C. | Bed dens g/cm³ | Sintered dens g/cm³ | Acceptable Yes/No |
| 6 | 0 | NB* | 60 | 130 | 0.36 | 0.75 bst 0.65 | No |

TABLE VI-continued

Effect of Surface Coating on Sintered Part of PC** host powder

| Ex | Coating Hi-Sil phr | Drop temp °C. | Powder Bed temp °C. | Target temp▲ °C. | Bed dens g/cm³ | Sintered dens g/cm³ avg | Acceptable Yes/No No |
|---|---|---|---|---|---|---|---|
| 7 | 0 | NB* | 60 | 80 | 0.38 | 0.58 | No |
| 8 | 0.67 | 113 | 90 | 140 | 0.57 | 0.95 | Yes |
| 9 | 0.67 | 113 | 90 | 150 | 0.57 | 0.85 | Yes |
| 10 | 0.67 | 113 | 100 | 150 | 0.57 | 0.84 | Yes |

**Calibre 200 polycarbonate 88μ
▲refer to Table IV for caking resistance

In ex 6 of Table VI, the WOS is 130°–131° = −1° C. which indicates there is no WOS for uncoated host PC powder. The part formed is dimensionally unacceptable as would be expected from the previous example.

In ex 7 of Table VI, the uncoated PC powder is held at a target bed temp of 80° C., far below the initial $T_g$, therefore again, there is no WOS.

In exs 8–10 of Table VI, for the coated PC powder, the target bed temp is 140°–150° C. which is above the initial $T_g$ of 131° C. so the WOS is in the range from 9° to 19° C. As can be seen the bed density is 0.57 which is desirably high. The part is acceptable because the drop temperature is within the range from (initial $T_g$ − 20° C.) but less than the final $T_g$.

In an analogous manner, using a laser of the same or comparable intensity, and radiant heating, samples of coated powder are sintered to provide scoops of the same configuration. To provide an indication of the strength of a sintered article which would be made from a densified powder, bars are also sintered and the fracture energy of the bars measured. The following combinations of 100 parts of host powder are made with the stated amount of coating powder: 177 μPMMA coated with 0.5 phr Hi-Sil; 177 μPMMA coated with 0.5 phr 0.2–0.4 μ titanium dioxide; 177 μABS coated with 20 phr 30 μPC; 177 μ polystyrene coated with 30 μ PC; 177 μ PMMA coated with 30 μ PC; 88 μ PC coated with 20 phr 44 μ PBT powder.

Having thus described specific embodiments of the invention, and provided specific illustrative examples of various mottled powders, it should now be apparent that many modifications can be made to prepare such sinterable powders for different purposes, without departing from the spirit and scope of the invention. It is therefore to be understood that no undue restrictions are to be imposed by reason of the specific embodiments illustrated and discussed, and particularly that the invention is not restricted to a slavish adherence to the details set forth herein.

I claim:

1. A laser sinterable mass of partially coated particles comprising, a host powder having host particles no greater than 177 μ, an initial bulk density in the range from 0.3–0.6 gm/cm³ and an initial glass transition temperature, initial Tg, higher than 50° C., said initial $T_g$ occurring at least 3° C. lower than said host powder's final $T_g$; and, a coating powder having coating particles which coat said host particles leaving at least some portion thereof uncoated;

said coating powder is selected from the group consisting of a substantially amorphous coating powder and a crystalline coating powder each having an average particle diameter in the range from 0.02μ–44 μ but smaller than said host particles, and a bulk density in the range from 0.15 to 0.35 gm/cm³;

said amorphous coating powder having an initial $T_g$ and sintering temperature higher than said final $T_g$ of said host particles, and said crystalline coating powder having a crystalline melting point and sintering temperature higher than said final $T_g$ of said host particles;

said partially coated particles being essentially free from electric charge, having an increased bulk density at least 10% higher than that of said host powder, and being flowable under applied force in the range from about 10 g-force to about 100 g-force, without caking at a storage temperature above the initial $T_g$ of said host powder but below said host powder's final $T_g$;

said increased bulk density being obtained by blending said host powder with said coating powder with an energy input greater than 30 watt-hr/lb of said host powder, so as to discharge coated powder at a drop temperature above a minimum drop temperature defined as initial $T_g$ minus 20° C., but at a drop temperature below said host powder's final $T_g$.

2. The laser sinterable mass of claim 1 wherein, said host powder has a $T_g$ which occurs, from initial $T_g$ to final $T_g$, over a range of from 3° C. to 50° C.; said mass is sinterable into a porous solid mass having a porosity in the range from about 0.1 to about 0.5 when said mass stored in a target bed of a sintering machine to be sintered by a laser beam so as to cause viscous flow only at contiguous boundaries of said particles of host powder, with at least some portion of substantially all particles remaining solid, said sintering being effected at a temperature within a window of sinterability in the range from above said host powder's initial $T_g$ when sintering commences, to its final $T_g$, above which sintering ceases; whereby said porous solid mass is autogenously densified.

3. The laser sinterable mass of claim 1 wherein said substantially amorphous coating powder is an amorphous inorganic or amorphous organic solid, has an average particle diameter in the range from 0.02 μ to less than 20 μ, an initial $T_g$ at least 20° C. higher than said host powder's final $T_g$, and, is present in an amount in the range from about. 0.1 of 20 parts by weight, based on 100 parts by weight of said partially coated particles.

4. The laser sinterable mass of claim 3 wherein said amorphous coating powder has an average particle diameter in the range from 0.02 μ to about 1 μ;

said amorphous inorganic solid is selected frown the group consisting of silica, alumina and glass-forming inorganic oxides; and, said amorphous organic solid is selected from the group consisting of poly(vinyl chloride), polycarbonate, poly(methyhnethacrylate), poly(phenylene oxide), a poly(phenylene oxide)/polystyrene blend, polystyrene, and acrylonitrile-butadiene-styrene terpolymer (ABS).

5. The laser sinterable mass of claim 4 wherein,
said host powder has an average particle size smaller than 105 μ, and an initial $T_g$ in the range from 50° C. to about 300° C.;
said coating powder has an average particle diameter in the range from 0.02 μ to less than 0.2 μ, and, said initial $T_g$ of said coating powder is higher than 200° C.

6. The laser sinterable mass of claim 4 wherein
said host powder is selected from the group consisting of poly(vinyl chloride) (PVC), poly(methylmethacrylate), polystyrene, polycarbonate, polycarbonate/nylon alloy, polycarbonate/polyester alloy, ABS, ABS/nylon alloy, ABS/PVC alloy, acrylic copolymers, polysulfone, polysulfone/ABS alloy, polyetherimides, polyamide-imides, polyarylates, fluoropolymers, polyphenylene oxide/polystyrene blend, and poly(phenylene sulfide); and, said coating powder has an average particle than diameter in the range from 0.02 μ to 0.2μ, and, a $T_g$ higher than 200° C.

7. The laser sinterable mass of claim 6 wherein
said host powder is selected from the group consisting of poly(vinyl chloride), poly(methylmethacrylate), and polycarbonate; and,
said amorphous coating powder is selected from the group consisting of silica, alumina, and glass-forming inorganic oxides.

8. The laser sinterable mass of claim 3 wherein said coating powder covers less than 50% of the surfaces of particles of said host powder.

9. The laser sinterable mass of claim 1 wherien said crystalline coating powder is a crystalline inorganic or crystalline organic solid, has an average particle diameter in the range from 0l02 μ to less than 20 μ, a melting point at least 20° C. higher than the final Tg of said host powder, and is present in an amount in the range from about 0.1 to 20 parts by weight, based on 100 parts by weight of said partially coated particles.

10. The laser sinterable mass of claim 9 wherein said crystalline coating powder has an average particle diameter in the range from 0.02 μ to less than about 1 μ;
said crystalline inorganic solid is selected from the group consisting of an oxide, carbonate or silicate of an element of Groups 2a, 3a, 4a and 4b of the Periodic Table; and,
said crystalline organic solid is selected from the group consisting of poly(butyleneterephthalate), nylon 11, poly(ethyleneterephthalate), poly(ether ether ketone), poly(phenylene sulfide) and polyolefin.

11. The laser sinterable mass of claim 10 wherein, said host powder has an average particle size smaller than 105 μ, and an initial $T_g$ in the range from 50° C. to about 300° C.;
said crystalline coating powder has an average particle diameter in the range from 0.02 μ to less than 0.2 μ and melting point higher than 200° C.

12. The laser sinterable mass of claim 1 wherein said coating powder covers less than 50% of the surfaces of particles of said host powder.

13. A laser sinterable mass of partially coated particles of substantially amorphous poly(vinyl chloride) PVC particles comprising, PVC particles no greater than 177 μ, having a bulk density in the range from 0.35 to 0.6 gm/cm$^3$, an initial $T_g$ occurring at about 65° C. and a final $T_g$ occurring at about 88° C.; and,
a coating powder having coating particles which coat said PVC particles leaving at least some portion thereof uncoated;
said coating powder is selected from the group consisting of a substantially amorphous coating powder and a crystalline coating powder each having an average diameter in the range from 0.02 —44 μ but smaller than said PVC particles, a bulk density in the range from 0.15 to 0.35, and, an initial $T_g$ higher than 100° C.;
said amorphous coating powder having an initial $T_g$ and sintering temperature higher than said final $T_g$ of said PVC particles, and said crystalline coating powder having a crystalline melting point and sintering temperature higher than said final $T_g$ of said PVC particles;
said partially coated particles of PVC having an increased bulk density at least 10% higher than that of said host PVC powder, being essentially free from electric charge, and flowable under applied force in the range from about 10 g-force to about 100 g-force, without caking at a storage temperature above 65° C. but below 130° C.; and,
said increased bulk density is obtained by blending said PVC powder with said coating powder with an energy input greater than 30 watt-hr/lb of said PVC powder, so as to discharge said partially coated PVC powder at a drop temperature above 65° C., but no higher than 88° C.

14. The laser sinterable mass of PVC particles of claim 13 wherein,
said mass is sinterable into a porous solid mass having a porosity in the range from about 0.1 to about 0.5 when stored in a target bed of a sintering machine to be sintered by a laser beam so as to cause viscous flow only at contiguous boundaries of said PVC particles, with at least some portion of substantially all particles remaining solid, said sintering being effected at a temperature within a window of sinterability in the range from above 65° C. when sintering commences, to 88° C., above which sintering ceases; whereby said porous solid mass is autogenously densified.

15. The sinterable mass of claim 13 wherein said substantially amorphous coating powder is an atnorphous inorganic or amorphous organic solid, has an average particle diameter in the range from 0.02 μto less than 20 μ, an initial $T_g$ at least 20° C. higher than 88° C., and, is present in an atnount in five range from about 0.1 to 20 parts by weight, based on 100 parts by weight of said partially coated PVC particles.

16. The sinterable mass of claim 15 wherein said amorphous coating powder has an average particle diameter in the range from 0.02 μ to less than about 1 μ;
said inorganic solid is selected from the group consisting of amorphous silica, alumina and glass-forming inorganic oxides; and,
said amorphous organic solid is selected from the group consisting of polycarbonate, poly(methylmethacrylate), poly(phenylene oxide), poly(phenylene oxide)/polymer blend, polystyrene, and acrylonitrile-butadiene-styrene terpolymer.

17. The mass of partially coated particles of claim 16 wherein said amorphous coating powder has an average particle diameter in the range from 0.02. μ to less than 0.2 μ and said initial $T_g$ of said coating powder is higher than 200° C.

18. The sinterable mass of claim 15 wherein said crystalline coating powder has an average particle diameter in the range from 0.02 μ to less than about 1 μ;
said crystalline inorganic solid is selected from the group consisting of an oxide. carbonate or silicate of an element of Groups 2a, 3a, 4a and 4b of the Periodic Table; and,
said crystalline organic solid is selected from the group consisting of poly(butyleneterephthalate), nylon 11, poly(ethyleneterephthalate), poly(ether ether ketone), and polyolefin.

19. The mass of partially coated particles of claim 18 wherein said crystalline coating powder has an average particle diameter in the range from 0.02 μ to less than 0.2 μ and said melting point of said coating powder is higher than 200° C.

20. The sinterable mass of claim 15 wherein said amorphous coating powder is an inorganic or organic solid, having an average particle diameter in the range from 0.02 μ to less than 1 μ and a melting point at least 100° C.

21. The sinterable mass of claim 13 wherein said crystalline powder is a crystalline inorganic or crystalline organic solid, has an average particle diameter in the range from 0.02 μ to less than 20 μ, a melting point at least 20° C. higher than 88° C., and, is present in an amount in the range from about 0.1 to 20 parts by weight, based on 100 parts by weight of said partially coated PVC particles. higher than 88° C.

22. The mass of partially coated particles of claim 21 wherein said coating powder is a crystalline solid having an average particle diameter in the range from 0.02 μ to less than 1 μ and a sintering temperature at least 100° C. higher than 88° C.

23. The mass of partially coated particles of claim 21 wherein said coating powder is a crystalline solid having an average particle diameter in the range from 0.02. μ to less than 1 μ and a sintering temperature at least 100° C. higher than 171° C.

24. The mass of partially coated particles of claim 23 wherein said crystalline coating powder has an average particle diameter in the range from 0.02 μ to less than 0.2 μ and said melting point of said coating powder is higher than 230° C.

25. The sinterable mass of claim 13 wherein said coating powder covers less than 50% of the surfaces of particles of said PVC powder.

26. The sinterable mass of claim 13 wherein, said PVC powder has an average particle size smaller than 05μ; said coating powder has an average particle size smaller than 0.2μ, and, said initial $T_g$ of said coating powder is higher than 200° C.

27. A laser sinterable mass of partially coated particles of substantially amorphous polycarbonate (PC) particles comprising,
host PC particles no greater than 177 μ, having a bulk density in the range from 0.33 to 0.55 gm/cm³, an initial $T_g$ occurring at about 130° C. and a final $T_g$ occurring at about 171° C.; and
a coating powder having coating particles which coat said PC particles leaving at least some portion thereof uncoated;
said coating powder is selected from the group consisting of a substantially amorphous coating powder having an initial $T_g$ higher than 200° C., and a crystalline coating powder each having an average diameter in the range from 0.02 μ–44 μ but smaller than said PC particles, a bulk density in the range from 0.15 to 0.35 gm/cm³, and, said partially coated particles of PC having an increased bulk density at least 10% higher than that of said host PC powder, being essentially free from electric charge, and flowable under applied force in the range from about 10 g-force to about 100 g-force, without caking at a storage temperature above 130° C. but below 171° C.; and, said increased bulk density is obtained by blending said PC powder with said coating powder with an energy input greater than 30 watt-hr/lb of said PC powder, so as to discharge said partially coated PC powder at a drop temperature above 130° C., but below 171° C.

28. The laser sinterable mass of PC particles of claim 27 wherein, said mass is sinterable into a porous solid mass having a porosity in the range from about 0.1 to about 0.5 when stored in a target bed of a sintering machine to be sintered by a laser beam so as to cause viscous flow only at Contiguous boundaries of said PC particles, with at least some portion of substantially all particles remaining solid, said sintering being effected at a temperature within a window of sinterability in the range from above 130° C. when sintering commences, to 171° C., above which sintering ceases; whereby said porous solid mass is autogenously densified.

29. The sinterable mass of claim 27 wherein said substantially amorphous coating powder is an amorphous inorganic or amorphous organic solid, has an average particle diameter in the range from 0.02 μ to less than 20 μ, an initial $T_g$ at least 20° C. higher than 171° C., and, is present in an amount in the range from about 0.1 to 20 parts by weight, based on 100 parts by weight of said partially coated PC particles.

30. The sinterable mass of claim 29 wherein said amorphous coating powder has an average particle diameter in the range from 0.02. μ to less than about 1 μ;
said amorphous inorganic solid is selected from the group consisting of silica, alumina, and glass-forming inorganic compounds; and,
said amorphous organic solid is selected from the group consisting of poly(vinyl chloride), polycarbonate, poly(methylmethacrylate), poly(phenylene oxide), poly(phenylene oxide)/polystyrene blend, polystyrene, and acrylonitrile-but. adiene-styrene terpolymer.

31. The sinterable mass of claim 27 wherein said crystalline coating powder is a crystalline inorganic or crystalline organic solid, has an average particle diameter in the range from 0.02 μ to less than 20 μ, a melting point at least 20° C. higher than 171° C., and. is present in an amount in the range from about 0.1 to 20 parts by weight, based on 100 parts by weight of said partially coated PC particles.

32. The sinterable mass of claim 31 wherein said crystalline coating powder has an average particle diameter in the range from 0.02 μ to less than about 1 μ;
said crystalline inorganic solid is selected from the group consisting of an oxide, Carbonate or silicate of an element of Groups 2a, 8a, 4a and 4b of the Periodic Table; and,
said crystalline organic solid is selected from the group consisting of poly(but. yleneterephthalate), nylon 11, poly(ethyleneterephthalate), and poly(ether ether keyone).

33. The sinterable mass of claim 27 wherein said coating powder covers less than 50% of the surfaces of particles of said PVC powder.

34. The sinterable mass of claim 27 wherein, said PC powder has an average particle diameter in the range from 0.02 μ to less than 105 μ; said coating powder has an average particle size smaller than 0.2 μ, and, said initial $T_g$ of said coating powder is higher than 200° C.

35. The sinterable mass of claim 27 wherein said amorphous coating powder is an inorganic or organic solid. having an average particle diameter in the range from 0.02. μ less than 1 μ and a melting point at least 100° C. higher than 171° C.

36. The mass of partially coated particles of claim 35 wherein said amorphous coating powder has an average particle diameter in the range from 0.02 μ to less than 0.2 μ and said initial $T_g$ of coating powder is higher than 230° C.

37. A process for preparing a mass of sinterable particles comprising,
(a) charging a mixture of powder particles to a blending zone, said mixture consisting essentially of
  (i) a thermoplastic synthetic resinous host powder having a glass transition temperature ($T_g$) occurring over a range of at least 3+ C., and an average host particle diameter no greater than about 177 μ, and,
  (ii) a coating powder selected from the group consisting of a substantially amorphous coating powder and a crystalline coating powder each having an average particle diameter in the range from 0.02 μ–44 μ but smaller than host particles of said host powder, and a bulk density in the range from 0.15 to 0.35 gm/cm³.
(b) blending said mixture of powder particles at high shear in said blending zone with energy in excess of about 30 watt-hr per lb of host powder until said mixture of powder particles reaches a chosen-drop temperature above (initial $T_g-20°$ C.) but below said host powder's final $T_g$; and, (c) discharging a blended mixture of partially coated host particles having at least some portion of their surfaces left uncoated, and the remaining portion coated with said coating particles, a bulk density at least 10% higher than that of said host powder, said blended mixture being flowable and storable without caking at a storage temperature above the initial $T_g$ of said host powder but below its final $T_g$, at which storage temperature said host powder would not be flowable as an uncoated powder.

38. The process of claim 37 wherein said mixture includes a thermooxidative stabilizer and a lubricant, each present in the range from 0.01 to 5 parts by weight.

* * * * *